US012783535B2

(12) United States Patent
Karve et al.

(10) Patent No.: US 12,783,535 B2
(45) Date of Patent: Nov. 3, 2026

(54) METHOD AND SYSTEM FOR PROCESSING GRAPH DATABASE QUERIES

(71) Applicant: JPMorgan Chase Bank, N.A., New York, NY (US)

(72) Inventors: Amit Karve, Thane (IN); Shammi Kapoor, Mumbai (IN); Pranali Naik, Mumbai (IN); Binny Koul, Thane (IN); Ravi Tewari, Navi Mumbai (IN); Shivani Jadhav, Thane (IN); Riya Karia, Ulhasnagar (IN); Saurabh Singh, Mumbai (IN); Tejas Patil, Navi Mumbai (IN); Nikhil Karkera, Shanti Park (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 19/039,071

(22) Filed: Jan. 28, 2025

(65) Prior Publication Data

US 2026/0169999 A1 Jun. 18, 2026

(30) Foreign Application Priority Data

Dec. 13, 2024 (IN) ............................. 202411098893

(51) Int. Cl.

| | |
|---|---|
| ***G06F 16/21*** | (2019.01) |
| ***G06F 16/242*** | (2019.01) |
| ***G06F 16/248*** | (2019.01) |
| ***G06F 16/901*** | (2019.01) |

(52) U.S. Cl.
CPC .......... *G06F 16/248* (2019.01); *G06F 16/212* (2019.01); *G06F 16/243* (2019.01); *G06F 16/9024* (2019.01)

(58) Field of Classification Search
CPC .... G06F 16/248; G06F 16/212; G06F 16/243; G06F 16/9024
See application file for complete search history.

(56) References Cited

U.S. PATENT DOCUMENTS

| | | | | |
|---|---|---|---|---|
| 10,268,699 | B2 * | 4/2019 | Farenden | G06F 40/30 |
| 10,691,685 | B2 * | 6/2020 | Verma | G06F 16/24522 |
| 10,872,083 | B2 * | 12/2020 | Lin | G06F 16/284 |
| 12,189,782 | B2 * | 1/2025 | Difonzo | G06F 16/9024 |
| 12,293,758 | B1 * | 5/2025 | Papangelis | G10L 15/1815 |
| 12,373,425 | B1 * | 7/2025 | Rai | G06F 16/248 |
| 12,399,892 | B2 * | 8/2025 | Cao | G06F 16/2433 |
| 12,530,349 | B2 * | 1/2026 | Tangari | G06F 16/24522 |
| 2021/0192397 | A1 * | 6/2021 | Rastogi | G06F 16/211 |

(Continued)

*Primary Examiner* — Jorge A Casanova
(74) *Attorney, Agent, or Firm* — Greenblum & Bernstein, P.L.C.

(57) ABSTRACT

A method and system for processing graph database queries are disclosed. The method includes receiving at least one input prompt from a user. Next, the method includes retrieving, using a model, a graph metadata and a schema from a graph database in response to the at least one input prompt. Next, the method includes training the model using the schema. Next, the method includes generating, using the trained model, at least one query that is compatible with the graph database, based on the schema and the at least one input prompt. Next, the method includes obtaining, from the graph database using the at least one query, at least one output that is responsive to the at least one input prompt.

20 Claims, 5 Drawing Sheets

(56) References Cited

U.S. PATENT DOCUMENTS

| | | | | |
|---|---|---|---|---|
| 2023/0169075 | A1* | 6/2023 | Han | G06F 16/243<br>707/769 |
| 2024/0061883 | A1* | 2/2024 | Vadapandeshwara | G06F 16/9024 |
| 2024/0062021 | A1* | 2/2024 | Tangari | G06F 16/243 |
| 2024/0338361 | A1* | 10/2024 | Hazel | G06F 16/2423 |
| 2024/0362208 | A1* | 10/2024 | Naufel | G06F 16/243 |
| 2025/0045256 | A1* | 2/2025 | Gottlob | G06F 16/2365 |
| 2025/0094737 | A1* | 3/2025 | Tangari | G06F 40/295 |
| 2025/0156649 | A1* | 5/2025 | Tangari | G06F 40/284 |
| 2025/0190710 | A1* | 6/2025 | Arthur | G06F 16/243 |
| 2025/0258685 | A1* | 8/2025 | Crabtree | A63F 13/40 |
| 2025/0258803 | A1* | 8/2025 | Liu | G06F 16/283 |
| 2025/0335794 | A1* | 10/2025 | Portisch | G06F 16/9024 |
| 2025/0390768 | A1* | 12/2025 | Turrell | G06N 5/022 |

* cited by examiner

METHOD AND SYSTEM FOR PROCESSING GRAPH DATABASE QUERIES

CROSS-REFERENCE TO RELATED APPLICATIONS

This application claims priority benefit from Indian Application No. 202411098893, filed on Dec. 13, 2024 in the India Patent Office, which is hereby incorporated by reference in its entirety.

FIELD OF THE DISCLOSURE

This technology generally relates to graph databases, and more particularly relates to a method and system to process graph database queries using a large language model (LLM).

BACKGROUND INFORMATION

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of the prior art.

With advancements in technology, various industries have been adopting automation by using various software and databases. One type of such a database is a graph database. A graph database is a type of database designed to represent and store data in a graph structure. Unlike traditional relational databases, which use tables with rows and columns, graph databases use nodes, edges, and properties to model and store data.

Graph databases offer techniques for data integration, linked data, and information sharing. Graph databases represent complex metadata or domain concepts in a standardized format and provide rich semantics for natural language processing. Knowledge graphs and master data management are the key use cases of these graph databases. Additionally, in the world of banking and finance, graph databases are widely used for improved customer experience, anti-money laundering, detecting money mules and mule fraud, and real-time fraud detection. Currently there are different graph databases available in the market, and each graph database supports a different query language.

To derive data insights or knowledge graphs from such databases, consumers need to understand specific query languages (for example, cypher query language, gremlin, protocol and SPARQL resource description framework (RDF) query language, graph structured query language (GSQL), etc.). Hence, it is not viable for a consumer to learn different specific languages and write queries in different languages for different graph databases. Additionally, there is no common service or a pattern which can be leveraged to interpret and derive the data insights by reading knowledge graphs extracted from the graph databases. The shortcomings of existing methods underscore the need for an innovative approach for deriving data insights from any existing graph databases.

Hence, in view of these and other existing limitations, there arises an imperative need to provide an efficient solution to overcome the above-mentioned limitations and to provide a method and system to process graph database queries.

SUMMARY

The present disclosure, through one or more of its various aspects, embodiments, and/or specific features or sub-components, provides, inter alia, various systems, servers, devices, methods, media, programs, and platforms to process graph database queries.

According to an aspect of the present disclosure, a method for processing graph database queries is disclosed. The method is implemented by at least one processor. The method includes receiving, by the at least one processor, at least one input prompt from a user. Next, the method includes retrieving, by the at least one processor using a model, a graph metadata and a schema from a graph database in response to the at least one input prompt. Next, the method includes training, by the at least one processor, the model using the schema. Next, the method includes generating, by the at least one processor using the trained model, at least one query that is compatible with the graph database, based on the schema and the at least one input prompt. Next, the method includes obtaining, by the at least one processor from the graph database using the at least one query, at least one output prompt that is responsive to the at least one input prompt.

In accordance with an exemplary embodiment, the at least one input prompt may include a natural language inquiry.

In accordance with an exemplary embodiment, the at least one input prompt may be received in one from among a text format and a speech format.

In accordance with an exemplary embodiment, the model may be a large language model (LLM).

In accordance with an exemplary embodiment, the graph metadata may include at least one from among nodes, relationships between the nodes, and labels associated with the nodes.

In accordance with an exemplary embodiment, the schema may include at least one from among nodes, edges, relationships between the nodes, relationship properties, tables, fields, and types of the nodes.

In accordance with an exemplary embodiment, the at least one output may include one from among a knowledge graph-based response in at least one visual representation format and a text format-based response for the at least one input prompt.

In accordance with an exemplary embodiment, the at least one visual representation format may include at least one from among a two-dimensional graph format, a three-dimensional graph format, and a chart format.

According to another aspect of the present disclosure, a computing device configured to implement an execution of a method for processing graph database queries is disclosed. The computing device includes a processor; a memory; and a communication interface coupled to each of the processor and the memory. The processor may be configured to receive at least one input prompt from a user. Next, the processor may be configured to retrieve, using a model, a graph metadata and a schema from a graph database in response to the at least one input prompt. Next, the processor may be configured to train the model using the schema. Next, the processor may be configured to generate, using the trained model, at least one query that is compatible with the graph database, based on the schema and the at least one input prompt. Next, the processor may be configured to obtain, from the graph database using the at least one query, at least one output that is responsive to the at least one input prompt.

In accordance with an exemplary embodiment, the at least one input prompt may include a natural language inquiry.

In accordance with an exemplary embodiment, the at least one input prompt may be received in one from among a text format and a speech format.

In accordance with an exemplary embodiment, the model may be a large language model (LLM).

In accordance with an exemplary embodiment, the graph metadata may include nodes, relationships between the nodes, and labels associated with the nodes.

In accordance with an exemplary embodiment, the schema may include at least one from among nodes, edges, relationships between the nodes, relationship properties, tables, fields, and types of the nodes.

In accordance with an exemplary embodiment, the at least one output may include one from among a knowledge graph-based response in at least one visual representation format and a text format-based response for the at least one input prompt.

In accordance with an exemplary embodiment, the at least one visual representation format may include at least one from among a two-dimensional graph format, a three-dimensional graph format, and a chart format.

According to yet another aspect of the present disclosure, a non-transitory computer-readable storage medium storing instructions for processing graph database queries is disclosed. The instructions include executable code which, when executed by a processor, may cause the processor to receive at least one input prompt from a user; retrieve, using a model, a graph metadata and a schema from a graph database in response to the at least one input prompt; train the model using the schema; generate, using the trained model, at least one query that is compatible with the graph database, based on the schema and the at least one input prompt; and obtain, from the graph database using the at least one query, at least one output that is responsive to the at least one input prompt.

In accordance with an exemplary embodiment, the at least one input prompt may include a natural language inquiry.

In accordance with an exemplary embodiment, the at least one input prompt may be received in one from among a text format and a speech format.

In accordance with an exemplary embodiment, the model may be a large language model (LLM).

In accordance with an exemplary embodiment, the graph metadata may include at least one from among nodes, relationships between the nodes, and labels associated with the nodes.

In accordance with an exemplary embodiment, the schema may include at least one from among nodes, edges, relationships between the nodes, relationship properties, tables, fields, and types of the nodes.

In accordance with an exemplary embodiment, the at least one output may include one from among a knowledge graph-based response in at least one visual representation format and a text format-based response for the at least one input prompt.

In accordance with an exemplary embodiment, the at least one visual representation format may include at least one from among a two-dimensional graph format, a three-dimensional graph format, and a chart format.

BRIEF DESCRIPTION OF THE DRAWINGS

The present disclosure is further described in the detailed description which follows, about the noted plurality of drawings, by way of non-limiting examples of exemplary embodiments of the present disclosure, in which like characters represent like elements throughout the several views of the drawings.

DETAILED DESCRIPTION

Figure 1:
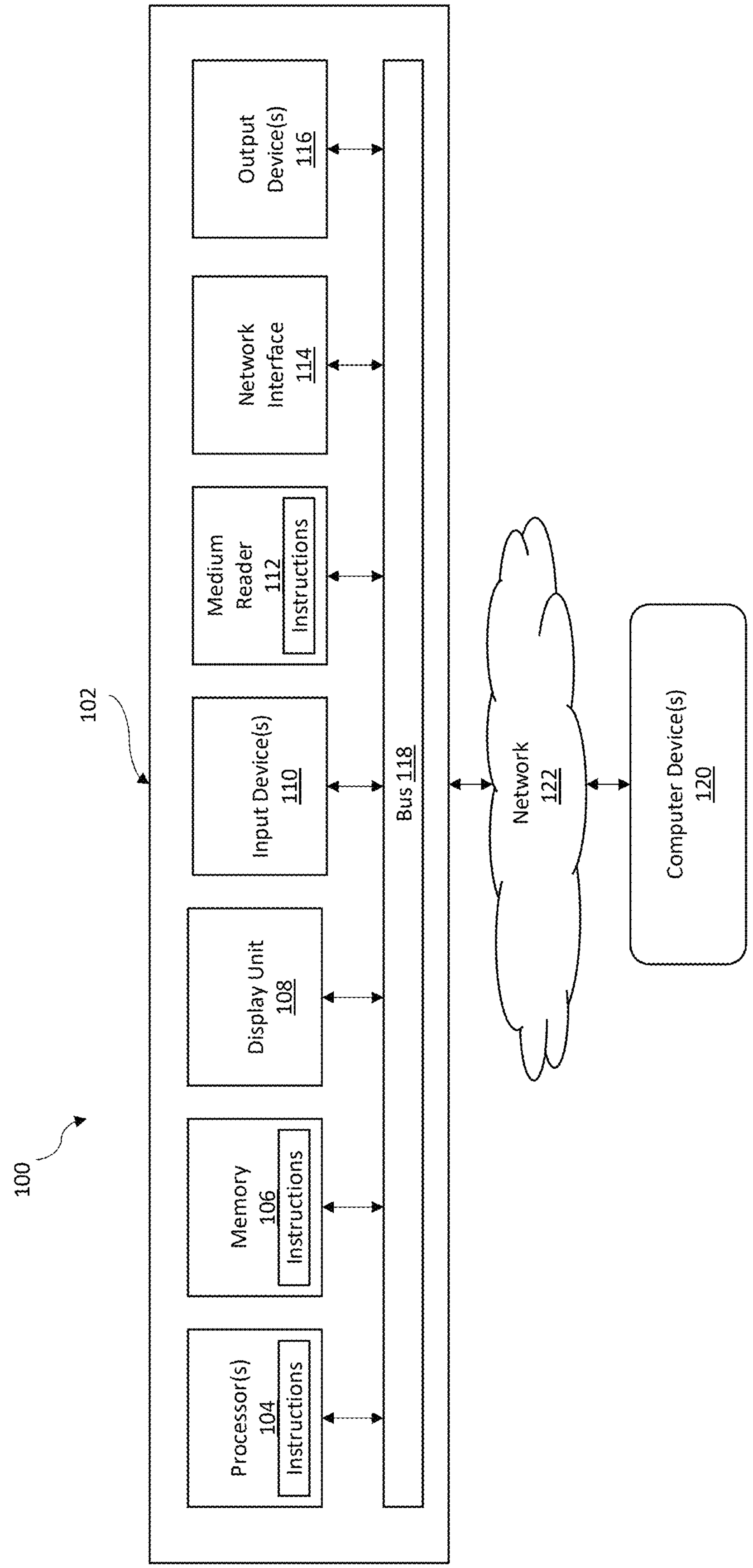
FIG. 1 illustrates an exemplary computer system for processing graph database queries, in accordance with an exemplary embodiment of the present disclosure.

Exemplary embodiments now will be described with reference to the accompanying drawings. The invention may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "include", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items. Also, as used herein, the phrase "at least one" means and includes "one or more" and such phrases or terms can be used interchangeably.

Unless otherwise defined, all terms (including technical and scientific terms) used herein have the same meaning as commonly understood by one of ordinary skills in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections and the actual physical connections may be different.

In addition, all logical units and/or controllers described and depicted in the figures include the software and/or hardware components required for the unit to function. Further, each unit may comprise within itself one or more components, which are implicitly understood. These components may be operatively coupled to each other and be configured to communicate with each other to perform the function of the said unit.

In the following description, for the purposes of explanation, numerous specific details have been set forth in order to provide a description of the disclosure. It will be apparent, however, that the invention may be practiced without these specific details and features.

Through one or more of its various aspects, embodiments and/or specific features or sub-components of the present disclosure, are intended to bring out one or more of the advantages as specifically described above and noted below.

The examples may also be embodied as one or more non-transitory computer-readable medium having instructions stored thereon for one or more aspects of the present technology as described and illustrated by way of the examples herein. The instructions in some examples include executable code that, when executed by one or more processors, causes the processors to carry out steps necessary to implement the methods of the examples of this technology that are described and illustrated herein.

Currently, there is a notable absence of systems or products or methods that can offer automation of generation of graph queries which are compatible with graph databases. Currently, a query generation process for any graph database is manual, and a user requires an understanding of a specific query language for deriving knowledge graphs or data insights from a specific graph database, hence such manual query generation process is a time consuming and labor-intensive task.

The present disclosure solves aforementioned problems by providing a method and system for processing graph database queries. In the present disclosure, at first, the system receives at least one input prompt from a user. Further, the system retrieves, using a model, a graph metadata and a schema from a graph database in response to the at least one input prompt. Further, the system trains the model using the schema. Further, the system generates, using the trained model, at least one query that is compatible with the graph database, based on the schema and the at least one input prompt. Thereafter, the system obtains, from the graph database using the at least one query, at least one output that is responsive to the at least one input prompt.

FIG. 1 is an exemplary system for use in accordance with the embodiments described herein. The system 100 is generally shown and may include a computer system 102 which is generally indicated. The term "computer system" may also be referred to as "computing device" and such phrases/terms can be used interchangeably in the specifications.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud-based environments. Even further, the instructions may be operative in such a cloud-based computing environment.

In a networked deployment, the computer system 102 may operate in the capacity of a server or as a client-user computer in a server-client user network environment, a client-user computer in a cloud-based computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smartphone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application-specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in or coupled to, a single device or multiple devices.

The computer system 102 may also include a computer memory 106. The computer memory 106 may include a static memory, a dynamic memory, or both in communication. Memories described herein are tangible storage mediums that can store data and executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are of an article about manufacture and/or machine components. Memories described herein are computer-readable mediums from which data and executable instructions can be read by a computer. Memories, as described herein, may be random access memory (RAM), read-only memory (ROM), flash memory, electrically programmable read-only memory (EPROM), electrically erasable programmable read-only memory (EEPROM), registers, a hard disk, a cache, a removable disk, tape, compact disk read-only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. As regards the present disclosure, the computer memory 106 may comprise any combination of memories or a single storage.

The computer system 102 may further include a display unit 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, for example, software, from any of the memories described herein. The instructions, when executed by a processor 104, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may include but is not limited to, a speaker, an audio out, a video out, a remote-controlled output, a printer, or any combination thereof. Additionally, the term "Network interface" may also be referred to as "Communication interface" and such phrases/terms can be used interchangeably in the specifications.

Each of the components of the computer system 102 may be interconnected and communicate via a bus 118 or other communication link. As shown in FIG. 1, the components may be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect expresses, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near-field communication, ultra-band, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor 104 described herein may be used to support a virtual processing environment.

As described herein, various embodiments provide methods and systems for processing graph database queries.

Figure 2:
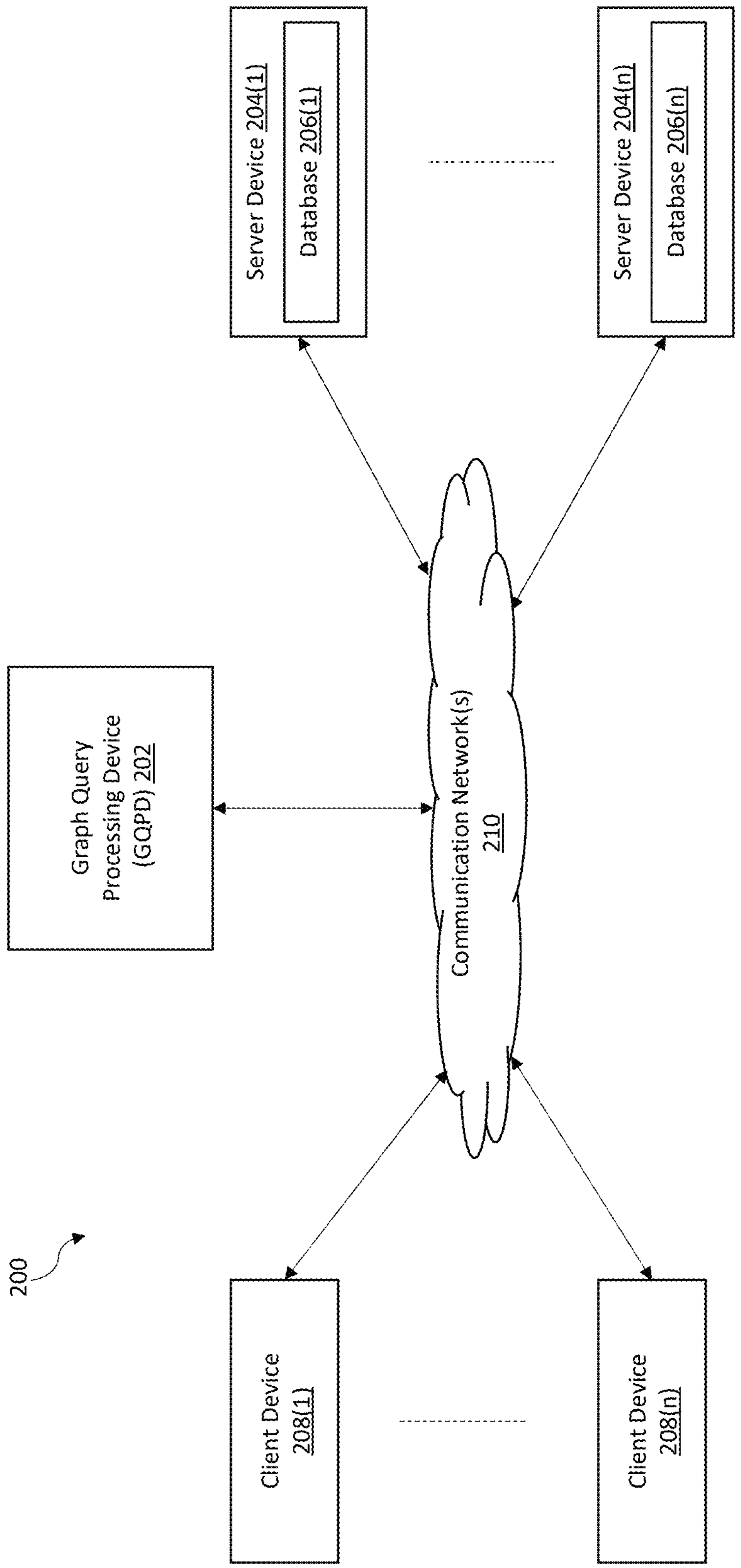
FIG. 2 illustrates an exemplary diagram of a network environment for processing graph database queries, in accordance with an exemplary embodiment of the present disclosure.

Referring to FIG. 2, a schematic of an exemplary network environment 200 for processing graph database queries is illustrated. In an exemplary embodiment, the method is executable on any networked computer platform, such as, for example, a personal computer (PC).

The method for processing graph database queries may be executed by a graph query processing device (GQPD) 202. The GQPD 202 may be the same or similar to the computer system 102 as described with respect to FIG. 1. The GQPD 202 may store one or more applications that may include executable instructions that, when executed by the GQPD 202, cause the GQPD 202 to perform desired actions, such as to transmit, receive, or otherwise process network messages, for example, and to perform other actions described and illustrated below with reference to the figures. The application(s) may be implemented as modules or components of other applications. Further, the application(s) may be implemented as operating system extensions, modules, plugins, or the like.

In a non-limiting example, the application(s) may be operative in a cloud-based computing environment. The application(s) may be executed within or as a virtual machine(s) or virtual server(s) that may be managed in a cloud-based computing environment. Also, the application(s), and even the GQPD 202 itself, may be located in the virtual server(s) running in a cloud-based computing environment rather than being tied to one or more specific physical network computing devices. Also, the application(s) may be running in one or more virtual machines (VMs) executing on the GQPD 202. Additionally, in one or more embodiments of this technology, virtual machine(s) running on the GQPD 202 may be managed or supervised by a hypervisor.

In the network environment 200 of FIG. 2, the GQPD 202 is coupled to a plurality of server devices **204(1)-204(*n*) that hosts a plurality of databases 206(1)-206(*n*), and also to a plurality of client devices 208(1)-208(*n*) via communication network(s) 210. A communication interface of the GQPD 202, such as the network interface 114 of the computer system 102 of FIG. 1, operatively couples and communicates between the GQPD 202, the server devices 204(1)-204(*n*), and/or the client devices 208(1)-208(*n*), which are all coupled together by the communication network(s) 210**, although other types and/or numbers of communication networks or systems with other types and/or numbers of connections and/or configurations to other devices and/or elements may also be used.

The communication network(s) 210 may be the same or similar to the network 122 as described with respect to FIG. 1, although the GQPD 202, the server devices **204(1)-204(*n*), and/or the client devices 208(1)-208(*n*) may be coupled together via other topologies. Additionally, the network environment 200** may include other network devices such as one or more routers and/or switches, for example, which are well known in the art and thus will not be described herein. This technology provides several advantages including methods, non-transitory computer-readable media, and GQPDs that efficiently implement the method for processing graph database queries.

By way of example only, the communication network(s) 210 may include local area network(s) (LAN(s)) or wide area network(s) (WAN(s)) and can use transmission control protocol/internet protocol (TCP/IP) over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (for example, voice, modem, and the like), public switched telephone networks (PSTNs), ethernet-based packet data networks (PDNs), combinations thereof, and the like.

The GQPD 202 may be a standalone device or integrated with one or more other devices or apparatuses, such as one or more of the server devices **204(1)-204(*n*), for example. In one particular example, the GQPD 202 may include or be hosted by one of the server devices 204(1)-204(*n*), and other arrangements are also possible. Moreover, one or more of the devices of the GQPD 202** may be in the same or a different communication network including one or more public, private, or cloud-based networks, for example.

The plurality of server devices **204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. In an example, the server devices 204(1)-204(*n*) may process requests received from the GQPD 202 via the communication network(s) 210** according to the hypertext transfer protocol (HTTP)-based and/or javascript object notation (JSON) protocol, for example, although other protocols may also be used.

The server devices **204(1)-204(*n*) may be hardware or software or may represent a system with multiple servers in a pool, which may include internal or external networks. The server devices 204(1)-204(*n*) host the databases or repositories 206(1)-206(*n*)** that are configured to store data related to schema, metadata of graphs, and at least one output against received at least one input prompt.

Although the server devices **204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a controller/agent approach, whereby one of the network computing devices of the server devices 204(1)-204(*n*)** operates to manage and/or otherwise coordinate operations of the other network computing devices.

The server devices **204(1)-204(*n*)** may operate as a plurality of network computing devices within a cluster architecture, a peer-to-peer architecture, virtual machines, or within a cloud-based architecture, for example. Thus, the technology disclosed herein is not to be construed as being limited to a single environment and other configurations and architectures are also envisaged.

The plurality of client devices **208(1)-208(*n*) may also be the same or similar to the computer system 102 or the computer device 120 as described with respect to FIG. 1, including any features or combination of features described with respect thereto. For example, the client devices 208(1)-208(*n*) in this example may include any type of computing device that can interact with the GQPD 202 via communication network(s) 210. Accordingly, the client devices 208(1)-208(*n*) may be mobile computing devices, desktop computing devices, laptop computing devices, tablet computing devices, or the like, that host chat, e-mail, or voice-to-text applications, for example. In an exemplary embodiment, at least one client device 208** is a wireless mobile communication device, for example, a smartphone.

The client devices **208(1)-208(*n*) may run interface applications, such as standard web browsers or standalone client applications, which may provide an interface to communicate with the GQPD 202 via the communication network(s) 210 in order to communicate user requests and information. The client devices 208(1)-208(*n*)** may further include, among other features, a display device, such as a display unit or touchscreen, and/or an input device, such as a keyboard, for example.

Although the exemplary network environment 200 with the GQPD 202, the server devices **204(1)-204(*n*), the client devices 208(1)-208(*n*), and the communication network(s) 210** are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the GQPD 202, the server devices **204(1)-204(*n*), or the client devices 208(1)-208(*n*), for example, may be configured to operate as virtual instances on the same physical machine. In other words, one or more of the GQPD 202, the server devices 204(1)-204(*n*), or the client devices 208(1)-208(*n*) may operate on the same physical device rather than as separate devices communicating through communication network(s) 210. Additionally, there may be more or fewer GQPDs 202, server devices 204(1)-204(*n*), or client devices 208(1)-208(*n*) than illustrated in FIG. 2**.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (for example, voice and modem), wireless traffic networks, cellular traffic networks, packet data networks (PDNs), the Internet, intranets, and combinations thereof.

Figure 3:
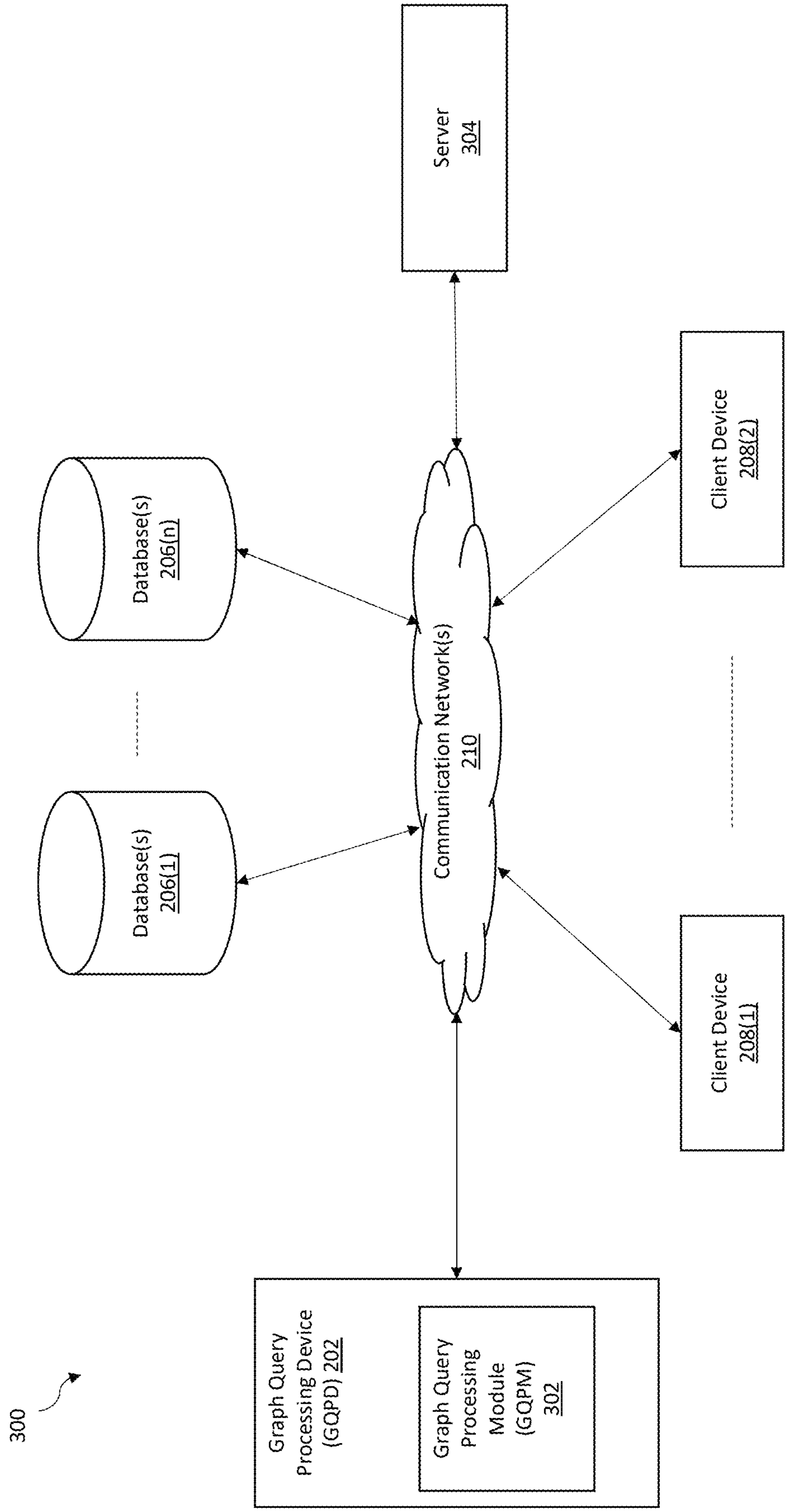
FIG. 3 illustrates an exemplary system for processing graph database queries, in accordance with an exemplary embodiment of the present disclosure.

FIG. 3 illustrates a system diagram for implementing a method for processing graph database queries, in accordance with an exemplary embodiment.

As illustrated in FIG. 3, the system 300 may include a graph query processing database (GQPD) 202 within which a graph query processing module (GQPM) 302 is embedded, a server 304, a database(s) 206(1) . . . **206(*n*), a plurality of client devices 208(1) . . . 208(2), and a communication network(s) 210**.

According to exemplary embodiments, the GQPD 202 including the GQPM 302 may be connected to the server 304, and the database(s) 206(1) . . . **206(*n*) via the communication network(s) 210, but the disclosure is not limited thereto. The GQPD 202 may also be connected to the plurality of client devices 208(1) . . . 208(2) via the communication network 210, but the disclosure is not limited thereto. The database(s) 206(1) . . . 206(*n*)** may include a rule database.

In an embodiment, the GQPD 202 is described and shown in FIG. 3 as including the GQPM 302, although it may include other rules, policies, modules, databases, or applications, for example. As will be described below, the GQPM 302 is configured to implement a method for processing graph database queries.

An exemplary system 300 for implementing a mechanism for processing graph database queries by utilizing the network environment of FIG. 2 is shown as being executed in FIG. 3. Specifically, a first client device 208(1) and a second client device 208(2) are illustrated as being in communication with the GQPD 202. In this regard, the first client device 208(1) and the second client device 208(2) may be "clients" of the GQPD 202 and are described herein as such. Nevertheless, it is to be known and understood that the first client device 208(1) and/or the second client device 208(2) need not necessarily be "clients" of the GQPD 202, or any entity described in association therewith herein. Any additional or alternative relationship may exist between either or both of the first client device 208(1) and the second client device 208(2) and the GQPD 202, or no relationship may exist.

Further, the GQPD 202 is illustrated as being able to access one or more databases 206(1) . . . **206(*n*). The GQPM 302 may be configured to access these repositories/databases for implementing a method for processing graph database queries. In some embodiment, the server 304 may be the same or equivalent to the server device 204 as illustrated in FIG. 2**.

The first client device 208(1) may be, for example, a smartphone. The first client device 208(1) may be any additional device described herein. The second client device 208(2) may be, for example, a personal computer (PC). The second client device 208(2) may also be any additional device described herein.

The process may be executed via the communication network(s) 210, which may comprise plural networks as described above. For example, in an exemplary embodiment, either or both the first client device 208(1) and the second client device 208(2) may communicate with the GQPD 202 via broadband or cellular communication. These embodiments are merely exemplary and are not limiting or exhaustive.

Figure 4:
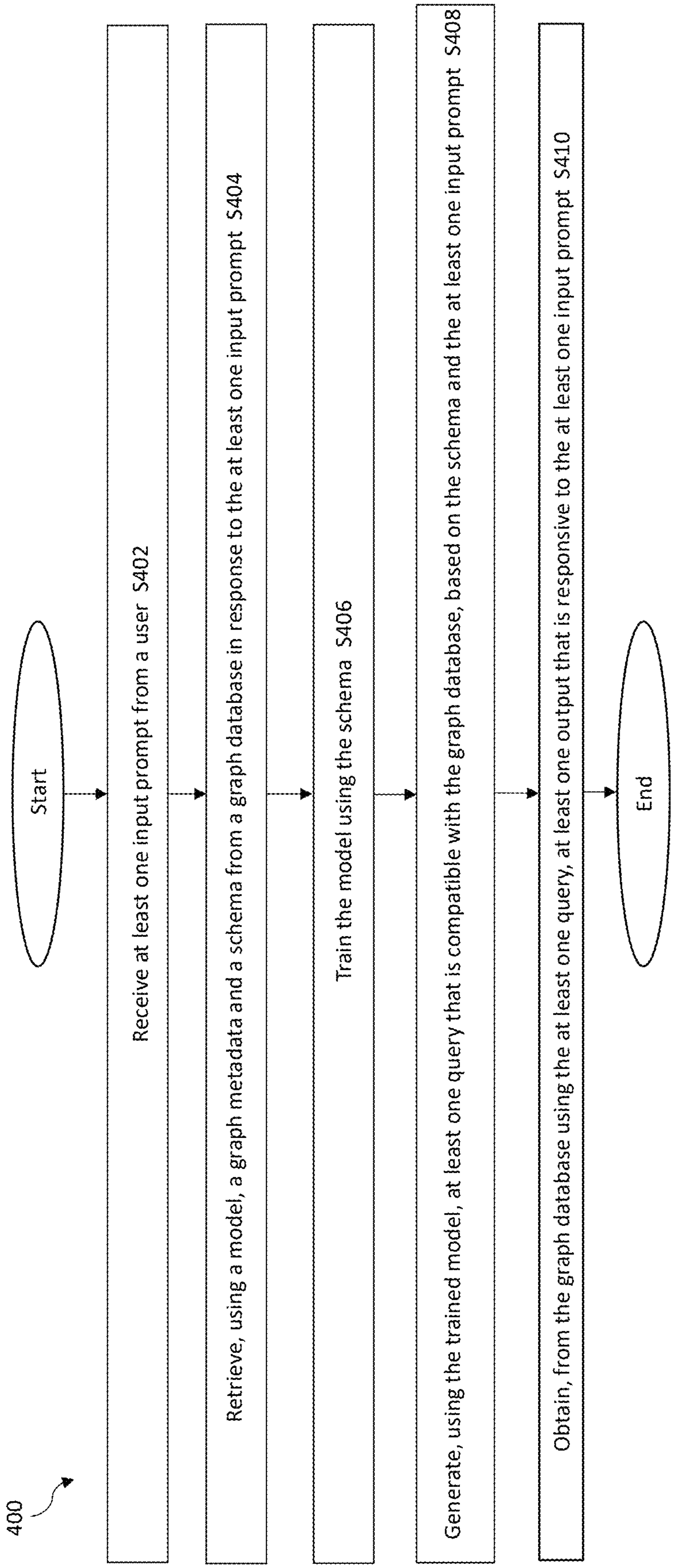
FIG. 4 illustrates an exemplary method flow diagram for processing graph database queries, in accordance with an exemplary embodiment of the present disclosure.

Referring to FIG. 4, an exemplary method 400 for processing graph database queries is shown, in accordance with an exemplary implementation.

As shown in FIG. 4, the method 400 begins following a need to develop a method for performing seamless integration with any of existing graph databases and for generating queries that are compatible with the respective graph databases to derive data insights from such graph databases. The method 400 is implemented by at least one processor 104.

At step S402, the method 400 includes receiving, by the at least one processor 104, at least one input prompt from a user. The at least one input prompt includes a natural language query and/or a natural language inquiry. The at least one input prompt is received in one from among a text format and a speech format.

A natural language query is a query or request or inquiry posed in everyday language by a user, rather than using the graph database's specific query language or syntax.

The term "input prompt" herein may correspond to an input provided by the user to a model that initiates the model's response. The input may be in the form of a question, a voice command, a statement, and/or any form of text that the user wants the model to process. In an example, in a chatbot of an application, the user may provide the input prompt in a text format such as, find a first name of an application owner where the application identity number is 322. An input in the speech format is a spoken command or query given to a model or a digital assistant.

In an example, the user may provide the at least one input prompt by using a user interface (UI) of an application installed in a user equipment (UE). The UE may be selected from but is not limited to, a smartphone, a laptop, a tablet, and a computer.

The term "application" herein may correspond to a software program or a tool that is designed to receive input from the user and to provide output to the user.

It will be appreciated by the person skilled in the art that the aim here is to create a system that creates and processes graph database queries using a large language model (LLM).

At step S404, the method 400 includes retrieving, by the at least one processor 104 using a model, a graph metadata and a schema from a graph database in response to the at least one input prompt. In an embodiment, the graph metadata includes at least one from among nodes, relationships between the nodes, and labels associated with the nodes.

The term "graph metadata" herein may correspond to data that describes the structure and schema of the graph database.

In an example, the method 400 includes reading, using the model, the graph metadata from the graph database.

In an implementation, the graph database is already selected by the user. In an exemplary implementation, a setup of a graph database is executed by the user. In an exemplary implementation, the setup of the graph database further includes converting, by the at least one processor 104, a plurality of application inventory data into data frames, received from at least one repository (for example, the at least one repository may belong to an organization). Next, the method includes generating, by the at least one processor 104, a graph database using the data. The at least one repository may be connected with the at least one processor 104 via a communication network. The communication network may be an Internet-based network.

In an embodiment, the model is a large language model (LLM). The schema refers to the structured definition and organization of data within a graph database, detailing how nodes and relationships are categorized, connected, and described.

In an embodiment, the schema includes at least one from among edges, nodes, relationships between the nodes, relationship properties (for example, in a social network graph relationship types may include friends with, located, etc.), tables, fields and types of the nodes (for example, in a social network graph, possible node types (or labels) might include a person, an event, and a location).

At step S406, the method 400 includes training, by the at least one processor 104, the model using the schema.

It is to be noted that the schema is used for self-training by the model. After completing the training, the trained model reads the at least one input prompt and analyzes the at least one input prompt.

At step S408, the method 400 includes generating, by the at least one processor 104 using the trained model, at least one query that is compatible with the graph database, based on the schema and the at least one input prompt.

In an example, the trained model is configured to generate the at least one query that is compatible with the graph database in order to derive data insights and/or a knowledge graph from the graph database.

At step S410, the method 400 includes obtaining, by the at least one processor 104 from the graph database, at least one output that is responsive to the at least one input prompt by using the at least one query. In an embodiment, the at least one output includes at least one from among a knowledge graph-based response in at least one visual representation format and/or a text format-based response for the at least one input prompt. In an embodiment, the at least one visual representation format includes at least one from among a two-dimensional graph format (for example, 2D knowledge graph), a three-dimensional graph format (3D knowledge graph), a chart format (for example, 3D bar chart, interactive line graph, pie chart), and/or any other combination thereof.

A knowledge graph is a structured representation of information that captures relationships between entities and their attributes. The knowledge graph is designed to integrate diverse data sources, thereby providing a comprehensive view of how entities are interconnected.

For example, in a chatbot of the application, the user may provide at least one input prompt in a text format such as, find a first name of an application owner where the application identity number is 322. In response to the provided at least one input prompt, at least one output is provided on the chatbot in a text format-based response such as: Match(s: bcms_I3seal) [sealowners_ _info]->(a:sealowners)-[: Application_owner]->(b) where s.applicationid=83368 return distinct b. employee_firstname.

In an example, the hierarchy view of the knowledge graph is presented as the at least one output over the application. A hierarchical view of a knowledge graph visualizes the structure and relationships between entities in a graph database or knowledge graph in a hierarchical manner.

In an example, a fluid chart is presented as the at least one output over the application. A fluid chart is a type of data visualization that represents information in a dynamic and flexible manner. In another example, a business intelligence (BI) report is presented as the at least one output for the at least one query. A BI report is a document or dashboard used to present and analyze business data in order to aid in decision-making.

In an exemplary implementation, by using the application, a three-dimensional graph (for example, a network graph) may be seen through a virtual reality (VR) headset. Additionally, in an augmented reality (AR) version, the user may be able to view various chart types (for example, three dimensional (3D) bars charts, interactive line graphs, and pie charts) that are scanned using a smartphone application or a chart portal. In an example, the user may use the smartphone application to visualize input data into charts and further scan such charts to convert them into AR versions. It is to be noted that the input data is provided to the smartphone application by the user. The present method thus helps in achieving dynamic data visualization with data insights using knowledge graphs. Thereafter, the method 400 terminates.

Figure 5:
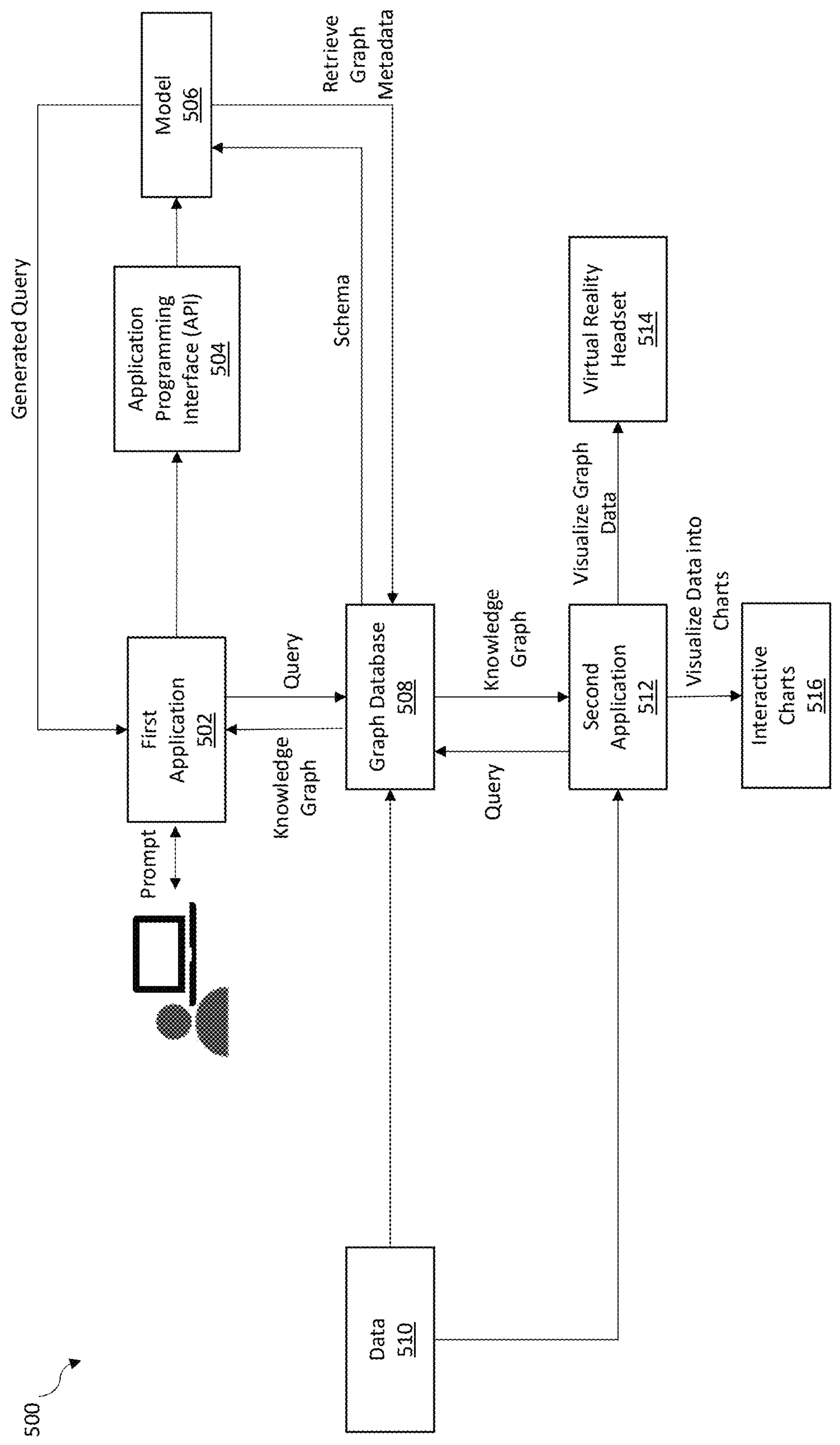
FIG. 5 illustrates an architecture of a system for processing graph database queries, in accordance with an exemplary embodiment of the present disclosure.

FIG. 5 illustrates an architecture of a system for processing graph database queries, in accordance with an exemplary implementation of the present disclosure. As illustrated in FIG. 5, the process flow 500 begins with receiving, from a user, at least one input prompt over a first application 502 (for example, Apache 360®) to derive required information from a graph database 508. The user may provide the at least one input prompt over the first application 502 by using a computing device. The computing device may be selected from but is not limited to, a laptop, a smartphone, and a tablet. The at least one input prompt request is received in one of a text format or a speech format. In an implementation, the first application 502 includes a user interface (UI) portal which has a chatbot feature where the user types or voices out the at least one input prompt.

Further, the first application 502 transmits the at least one input prompt to an application programming interface (API) 504 (for example, a flask API). The API 504 may act as a microservice framework where a speech-based input prompt is converted into a text format before passing it to a model 506. The model 506 is a large language model (LLM) model (for example, openAI™, large language model meta AI (LLAMA2) or a deep seeker model, etc.). The model 506 further reads and retrieves a graph metadata from the graph database 508. The graph metadata may include at least one from among nodes, relationships between the nodes, tables, and/or labels from the graph database 508. Further, a schema is retrieved by the model 506 from the graph database 508 for training purposes. The model 506 is trained using the schema. The schema may include at least one from among edges, nodes, relationships between the nodes, relationship properties, tables, fields and types of the nodes. After completion of the training, the model 506 reads the at least one input prompt and generates at least one query that is compatible with the graph database 508. Further, the model 506 transmits the at least one query to the chatbot present within the first application 502 in response to the at least one input prompt. The first application 502 further transmits the at least one query to the graph database 508 and obtains at least one output from the graph database 508. The at least one output may include a knowledge graph-based response in at least one visual representation format or a text format-based response that is responsive to the at least one input prompt. In an embodiment, the at least one visual representation format includes at least one from among a two-dimensional graph format, a three-dimensional graph format, a chart format, and/or any other combination thereof.

In an implementation, a second application 512 (for example, a react application) is configured to render the knowledge graph in the at least one visual representation format using either a browser such as a two dimensional (2D) or a three dimensional (3D) visualization or a virtual reality (VR) headset 514 (such as VR visualization). In an exemplary implementation, the user may utilize the second application 512 to generate the interactive charts 516 by providing input data 510 and visualize the interactive charts 516 in an augmented reality (AR) version by scanning such charts 516. The second application 512 may have a chart portal where the user can dynamically render various chart types based on selected input data and columns. Further, scanning these charts with the second application 512 may enable rendering of AR versions of such charts (for example, 3D bars charts, interactive line graphs, and pie charts). In this way, the system is configured to create and process queries that are compatible with the graph database.

The present disclosure provides numerous advantages as given below. The present disclosure provides a method for creating queries that are compatible with any of existing graph databases and for processing such queries to derive data insights from such graph databases. The present disclosure provides a universal plugin tool compatible with existing graph databases. The method allows users to visualize knowledge graphs received from the graph database in multiple visual representational formats. The disclosed method eliminates the need to learn different graph database specific languages and helps consumers to automate queries that are compatible with the graph databases with respect to specific languages. The method allows the user to provide input prompts in text as well as voice prompts, and utilizes such input prompts to generate queries that are compatible with a graph database.

Although the invention has been described with reference to several exemplary embodiments, it is understood that the words that have been used are words of description and illustration, rather than words of limitation. Changes may be made within the purview of the appended claims, as presently stated, and as amended, without departing from the scope and spirit of the present disclosure in its aspects. Although the invention has been described with reference to particular means, materials, and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The terms "computer-readable medium" and "computer-readable storage medium" shall also include any medium that is capable of storing, encoding, or carrying a set of instructions for execution by a processor 104 or that causes a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tape, or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application-specific integrated circuits, programmable logic arrays, and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

According to an aspect of the present disclosure, a non-transitory computer-readable storage medium storing instructions for processing graph database queries is disclosed. The instructions include executable code which, when executed by a processor 104, may cause the processor 104 to receive at least one input prompt from a user; retrieve, using a model, a graph metadata from a graph database in response to the at least one input prompt; obtain, using the model, a schema from the graph metadata in response to the at least one input prompt; train the model using the schema; generate, using the trained model, at least one query that is compatible with the graph database, based on the schema and the at least one input prompt; and obtain, from the graph database using the at least one query, at least one output that is responsive to the at least one input prompt.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually, and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. A method of implementing a universal plugin tool that processes graph database queries, the method comprising:

receiving, at least one input prompt from a user;

in response to the at least one input prompt:

utilizing a model to retrieve, graph metadata from a graph database that is configured to utilize at least one from among nodes, edges and properties to model and store data, and further utilizing the model to retrieve, from the graph database, a schema that is based on a structured definition and organization of the data within the graph database;

utilizing the schema to train the model according to a training technique that is compatible with large language models;

generating, using the trained model, at least one query that is configured to derive, from the graph database, based on the schema and the at least one input prompt, insights and a knowledge graph, wherein the knowledge graph comprises a structured representation of information that captures relationships between entities and attributes of the entities;

obtaining, from the graph database using the at least one query, at least one output that is responsive to the at least one input prompt, wherein the at least one output comprises a knowledge graph response that includes the knowledge graph; and utilizing the schema to render an interactive multi-dimensional visual representation of the knowledge graph.

2. The method as claimed in claim 1, wherein the at least one input prompt comprises a natural language inquiry.

3. The method as claimed in claim 1, wherein the at least one input prompt is received in one from among a text format and a speech format.

4. The method as claimed in claim 1, wherein the model is a large language model (LLM) that is based on at least one from among a generative pre-trained transformer architecture, an auto-regressive architecture, a mixture-of-experts architecture, and a multi-head latent attention architecture.

5. The method as claimed in claim 1, wherein the graph metadata corresponds to at least one from among the nodes, relationships between the nodes, and labels associated with the nodes.

6. The method as claimed in claim 1, wherein the schema corresponds to at least one from among edges, the nodes, relationships between the nodes, relationship properties, tables, fields, and types of the nodes.

7. The method as claimed in claim 1, wherein the at least one output comprises one from among the knowledge graph response in at least one visual representation format; and a text format-based response for the at least one input prompt.

8. The method as claimed in claim 7, wherein the at least one visual representation format comprises at least one from among a two-dimensional graph format, a three-dimensional graph format, and a chart format.

9. A computing device configured to implement a universal plugin tool that processes graph database queries, the computing device comprising:

a processor;

a memory; and a communication interface coupled to each of the processor and the memory, wherein the processor is configured to:

receive at least one input prompt from a user;

in response to the at least one input prompt:

utilize a model to retrieve, graph metadata from a graph database that is configured to utilize at least one from among nodes, edges and properties to model and store data, and further utilize the model to retrieve, from the graph database, a schema that is based on a structured definition and organization of the data within the graph database;

utilize the schema to train the model according to a training technique that is compatible with large language models;

generate, using the trained model, at least one query that is configured to derive, from the graph database, based on the schema and the at least one input prompt, insights and a knowledge graph, wherein the knowledge graph comprises a structured representation of information that captures relationships between entities and attributes of the entities;

obtain, from the graph database using the at least one query, at least one output that is responsive to the at least one input prompt, wherein the at least one output comprises a knowledge graph response that includes the knowledge graph; and utilize the schema to render an interactive multi-dimensional visual representation of the knowledge graph.

10. The computing device as claimed in claim 9, wherein the at least one input prompt comprises a natural language inquiry.

11. The computing device as claimed in claim 9, wherein the at least one input prompt is received in one from among a text format and a speech format.

12. The computing device as claimed in claim 9, wherein the model is a large language model (LLM) that is based on at least one from among a generative pre-trained transformer architecture, an auto-regressive architecture, a mixture-of-experts architecture, and a multi-head latent attention architecture.

13. The computing device as claimed in claim 9, wherein the graph metadata corresponds to at least one from among the nodes, relationships between the nodes, and labels associated with the nodes.

14. The computing device as claimed in claim 9, wherein the schema corresponds to at least one from among the nodes, edges, relationships between the nodes, relationship properties, tables, fields, and types of the nodes.

15. The computing device as claimed in claim 9, wherein the at least one output comprises one from among the knowledge graph response in at least one visual representation format; and a text format-based response for the at least one input prompt.

16. The computing device as claimed in claim 15, wherein the at least one visual representation format comprises at least one from among a two-dimensional graph format, a three-dimensional graph format, and a chart format.

17. A non-transitory computer readable storage medium storing instructions for implementing a universal plugin tool that processes graph database queries, the storage medium comprising executable code which, when executed by a processor, causes the processor to:

receive at least one input prompt from a user;

in response to the at least one input prompt:

utilize a model to retrieve, graph metadata from a graph database that is configured to utilize at least one from among nodes, edges and properties to model and store data, and further utilize the model to retrieve, from the graph database, a schema that is based on a structured definition and organization of the data within the graph database;

utilize the schema to train the model according to a training technique that is compatible with large language models;

generate, using the trained model, at least one query that is configured to derive, from the graph database, based on the schema and the at least one input prompt, insights and a knowledge graph, wherein the knowledge graph comprises a structured representation of information that captures relationships between entities and attributes of the entities;

obtain, from the graph database using the at least one query, at least one output that is responsive to the at least one input prompt, wherein the at least one output comprises a knowledge graph response that includes the knowledge graph; and utilize the schema to render an interactive multi-dimensional visual representation of the knowledge graph.

18. The storage medium as claimed in claim 17, wherein the at least one input prompt is received in one from among a text format and a speech format.

19. The storage medium as claimed in claim 17, wherein the graph metadata corresponds to at least one from among the nodes, relationships between the nodes, and labels associated with the nodes.

20. The storage medium as claimed in claim 17, wherein the at least one output comprises one from among the knowledge graph response in at least one visual representation format; and a text format-based response for the at least one input prompt.

* * * * *